United States Patent [19]

Spence

[11] 4,086,990
[45] May 2, 1978

[54] TEMPERATURE CONTROLLED HYDRAULIC COUPLING WITH SEPARATE TUBE

[75] Inventor: Henry Joseph Spence, Indianapolis, Ind.

[73] Assignee: Wallace Murray Corporation, New York, N.Y.

[21] Appl. No.: 741,700

[22] Filed: Nov. 15, 1976

[51] Int. Cl.² ........................ F16D 35/00; F16D 43/25
[52] U.S. Cl. ................................. 192/58 B; 192/82 T
[58] Field of Search ............................ 192/58 B, 82 T

[56] References Cited
U.S. PATENT DOCUMENTS 3,458,020  7/1969  Lutz ................................. 192/58 B
4,007,819  2/1977  Maci ................................. 192/58 B

*Primary Examiner*—Allan D. Herrmann
*Attorney, Agent, or Firm*—Thomas J. Greer, Jr.

[57] ABSTRACT

A shear liquid coupling of the temperature controlled type for driving the cooling fan of the radiator of an internal combustion engine. The specific improvement resides in the use of a separate tube for returning drive shear liquid from a zone adacent the drive rotor periphery to the shear liquid reservoir. The use of such a separate tube obviates the need of drilling (or casting) a return shear liquid passage in the coupling. Further, the use of such a separate tube permits operation in either direction of fan rotation.

5 Claims, 4 Drawing Figures

TEMPERATURE CONTROLLED HYDRAULIC COUPLING WITH SEPARATE TUBE

This invention relates to a fluid coupling for a temperature controlled fan drive displaying particular utility in the cooling system of an internal combustion engine. Such fan drives are well known and are presently classified in Class 192, Sub-class 58 of the United States Patent Office classification system. One example of such a device is shown in U.S. Pat. No. 3,568,647 issued to Adams. Another example is a literature publication entitled COMPARISION OF MODULATED VISCOUS v. ON-OFF FAN CLUTCHES by Everett G. Blair, Society of Automotive Engineers Publication 750,596 dated Aug. 12–16, 1974, herein incorporated by reference. In an internal combustion engine of the water cooled type, a cooling liquid is passed through passageways in the engine block. These passageways are part of a hydraulic circuit which includes a pump and a heat exhanger, the heat exchanger commonly termed a radiator. In operation, the pump forces the cooling liquid through the passageways in the engine block to cool it, heat from the engine passing to the coolant liquid, and now heated coolant liquid passing to the radiator where fan-driven air passes therethrough to effect the heat exchange operation and thereby lower the temperature of the coolant liquid. The now cooled liquid enters the passageways of the engine block, thus completing the heat exchange cycle. In the type of fan drive which is temperature controlled, a shear liquid coupling rotatably connects the fan to the engine. As the engine rotates, the fan rotates, supplying the force for pulling air through the radiator for the above-mentioned heat exchange or cooling function. In a temperature controlled type of operation, the degree of coupling between the engine and the rotary fan is varied according to the cooling requirements of the engine. Thus, when the automobile or other vehicle is traveling rather rapidly, ambient air is naturally forced through the radiator and accordingly the air flow required of the fan is appreciably diminished. On the other hand, if the vehicle is moving relatively slowly or is at a complete standstill, particularly at relatively high ambient temperatures, then the air flow required of the fan is higher. By thus matching airflow with the cooling requirements of the engine, more efficient operation is enjoyed.

In a typical temperature controlled fluid coupling between the engine and the cooling fan of the radiator cooling system a drive disc is coupled to the engine. The drive disc is received by a housing, the drive disc fitting within a drive cavity of the housing. The housing carried the fan blades. A separate cavity in the coupling, termed a reservoir, communicates through a temperature controlled valve with the drive chamber. The coupling housing includes a dam adjacent the periphery of the drive rotor, and a liquid passageway extends from adjacent the dam and radially inwardly therefrom to the reservoir. The reservoir is thus more or less centrally located within the coupling. The dam construction and location is such that upon relative rotation between the drive rotor and housing, the shear liquid is continuously thrown against the dam. It then passes through the passageway back to the reservoir. When relatively high cooling requirements are present it is desired to have a maximum amount of the shear liquid in the drive chamber. Accordingly, the temperature controlled liquid communication (valve) between the reservoir and the drive chamber is open its fullest amount. Thus, while liquid is continually being abstracted or emptied from the drive chamber by virtue of the action of the dam, the liquid is continuously being resupplied from the reservoir to the drive chamber through the now fully open (valve) communication. When however cooling requirements of the engine are at a minimum, the shear liquid is continuously abstracted from the drive chamber by the dam into the reservoir, with the fluid communication (valve) between the reservoir and the drive chamber now closed. Thus, a lesser amount of shear liquid is available and accordingly output speed is reduced with a corresponding reduction in parasitic power from the engine.

In typical prior-art constructions of hydraulic fan couplings of this type, the radially extending passageway between the dam and the reservoir is either cast into or drilled in the housing. This entails some expense. Further, there are situations where a clockwise direction of rotation of the drive rotor with respect to the housing is required, while other situations demand a counter-clockwise direction of rotation. If the return passageway is drilled or cast into the housing, as was the practice in the prior art, then interchangability between counterclockwise and clockwise direction of rotation is generally not possible. This is because the return passageway is located with respect to one or the other of two abutment faces of the dam.

According to the practice of this invention, the expense of casting or drilling such a return passageway between a region adjacent the dam and the shear liquid reservoir is obviated by the use of a separate tube, the tube extending in a generally radial direction. The radially outermost end of the tube extends from a region adjacent the dam to the radially inwardly disposed reservoir. The tube is conveniently placed within a channel or groove on one of the interior surfaces of the drive chamber of the housing. To accommodate interchangability for the two rotations, a similar channel may be formed into the housing adjacent the other face of the dam. Thus, the same components of the coupling device may be assembled in only a slightly different manner, with the same separate tube, so as to accommodate use for either direction of relative rotation between the drive rotor and the coupling housing.

Figure 3:
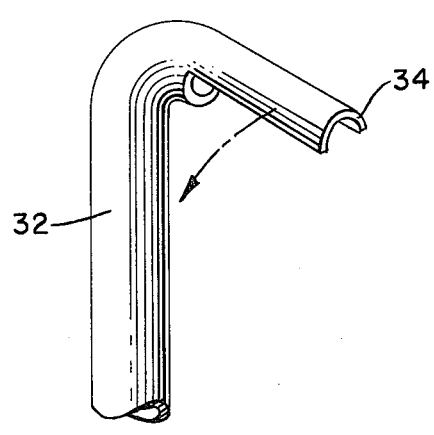
FIG. 3 is a partial perspective view of the radially outermost portion of the separate tube liquid passageway of this invention.
Figure 4:
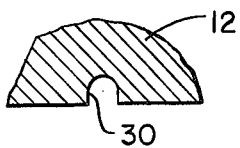
FIG. 4 is a view indicating a channel on one of the surfaces of the drive chamber of the coupling of FIG. 1.

Referring now to the drawings, the numeral 10 indicates a hydraulic fan coupling according to this invention and includes a cover 12 coupled to an annular element 14. Elements 12 and 14 define a housing. The numeral 16 indicates the root portion of fan blades coupled to the housing as by threaded fasteners. The numeral 18 denotes one end of a drive shaft, the shaft in turn carrying, as by threaded fasteners, the drive rotor or drive disc 22. The shaft 18 is adapted to be coupled to the engine or other prime mover as by securing it to a pulley or other rotary element coupled to the engine output. The numeral 24 denotes a drive chamber into which the drive rotor 22 is positioned. The numeral 30 denotes any one of two channels or grooves extending from either side of dam 31 and thence radially inwardly. The channels are thus on a right-hand interior surface of drive chamber 24, i.e., on the left-hand face of housing cover 12. The numeral 32 indicates a separate tube whose radially outermost portion is bent, the bent portion having a generally semi-cylindrical configuration removed to thereby devine a semi-cylindrical portion 34. This is shown in FIG. 3 of the drawings. The numeral 36 indicates a continuous circular groove on the left face of drive chamber 24, i.e., on the right face of housing portion 14. The tip of bent, semi-cylindrical portion 34 extends into groove 36, and may contact it, for proper radial positioning of this tube end. The numeral 38 indicates a silicone bumper to take up tolerance and to clamp the tube end axially between the groove 36 and the housing portion 12. The numeral 39 indicates the radially innermost portion of separate tube 32, this portion also bent and extending through an aperture in partition 40. Partition 40 establishes two chambers, the drive chamber 24 which receives the drive rotor 22 and a reservoir chamber 42 for shear liquid generally of the silicone type. The reader will understand that the particular type of shear liquid forms no part of the invention. The numeral 44 schematically indicates a temperature controlled valve for establishing fluid communication between drive chamber 24 and reservoir 42. Any desired means may be employed for introducing the shear liquid into the hydraulic coupling.

Figure 1:
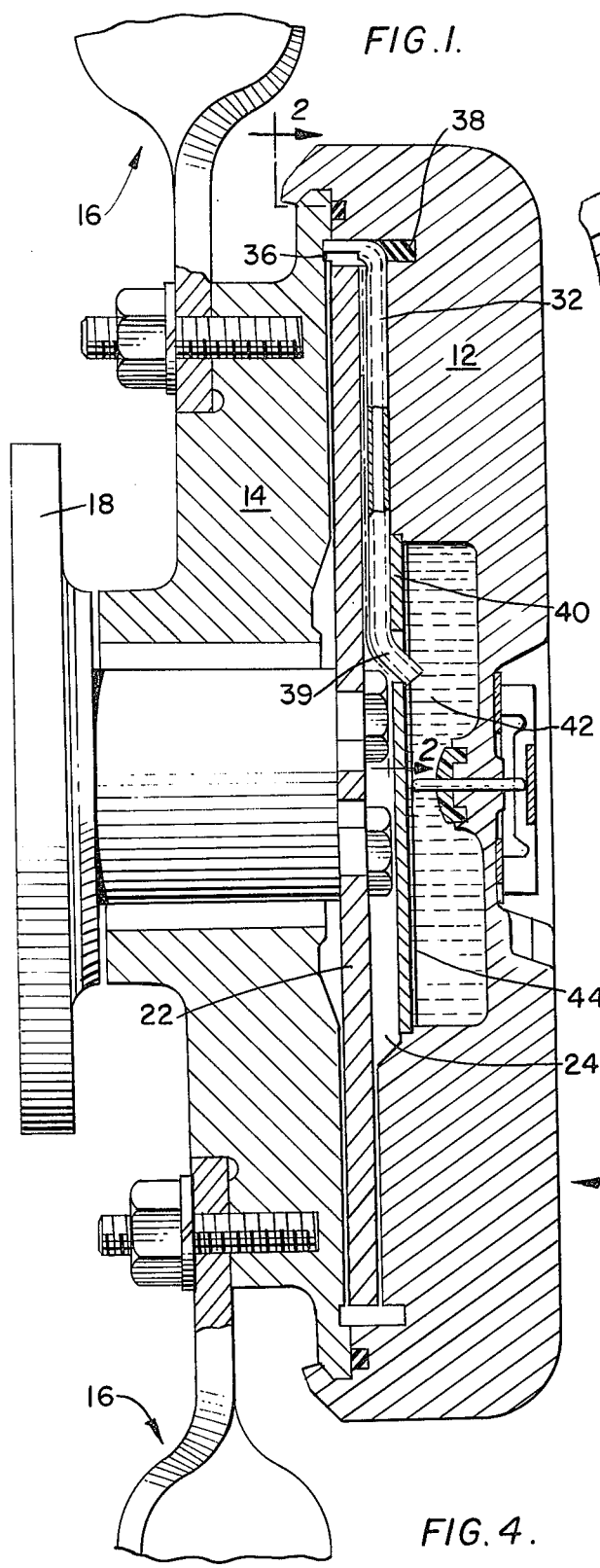
FIG. 1 is a partially schematic transverse cross-section of a temperature controlled hydraulic fan drive according to the practice of this invention.
Figure 2:
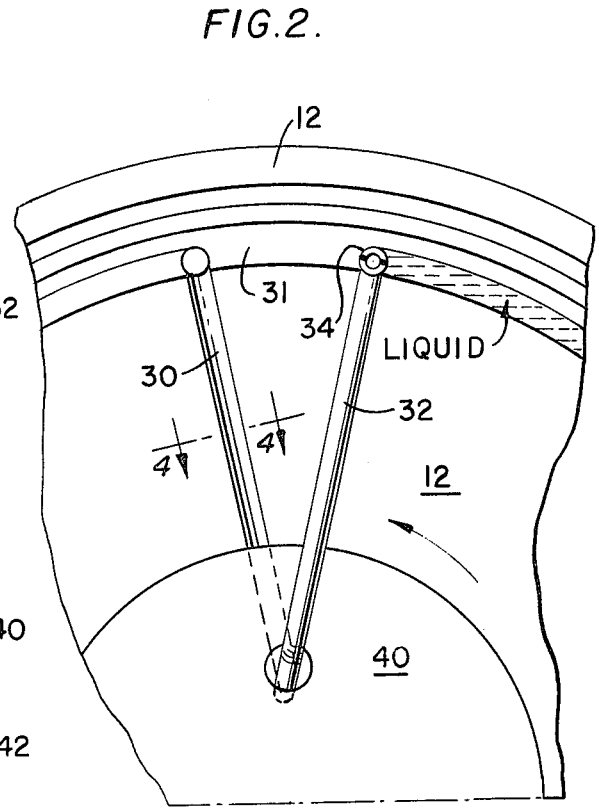
FIG. 2 is a view taken along section 2—2 of FIG. 1.

The mode of operation of the device is as follows. Assuming a clockwise direction of rotation of drive rotor 22 with respect to cover 12, as indicated by the arrow at FIG. 2, the drive rotor carries with it a portion of the shear liquid in drive chamber 24, thus imparting rotation to the interior surfaces of the drive chamber, this in turn causing rotation of the housing and consequent rotation of the fan blades 16. A portion of this liquid finds its way to an area just radially outwardly of the periphery of the rotor 22, as indicated by the word LIQUID at FIG. 2. For the indicated direction of rotation, the liquid strikes the right-hand abutment portion or face of dam 31 and is deflected downwardly through separate tube 32 and into shear liquid reservoir 42. Assuming relatively high engine cooling requirements, temperature responsive valve 44 is open, thereby permitting the maximum quantity of shear liquid to pass into drive chamber 24. When, however, cooling requirements are a minimum, the temperature response of valve 44 is either completely or partially closed, thereby dictating a minimum amount of drive shear liquid in drive chamber 24 with correspondingly lessened power abstracted from the engine by fan blades 16.

In the event that a different direction of relative rotation is desired for a particular use or installation, the same separate tube 32 is now placed within the left channel or groove 30, (see FIG. 2) with tip 34 now positioned adjacent the left abutment face of dam 31. The liquid circulation action will be the same, namely, the dam forces the fluid into tube end 34 and thence radially inwardly into reservoir 42 through tube 32.

While the invention has been described with respect to a construction wherein the fan blades are carried by the housing it is apparent that the housing could be rotatably connected to the engine and the fan blades coupled to element 18. The above description has shown tube 32 in a hydraulic coupling of the temperature controlled type. Further, the hydraulic coupling illustrated carries both a drive chamber and a reservoir chamber. It is to be understood, however, that the utility of the tube is not limited to such hydraulic couplings but may be employed with any similar couplings where the shear liquid is to be circulated or otherwise passed in a generally radial direction.

What is claimed is:

1. A fluid coupling being of the type having a drive rotor adapted to be rotatably connected with respect to the drive rotor, the housing having a drive chamber receiving the drive rotor, shear liquid in the drive chamber, a shear liquid reservoir carried by the housing, a dam in the housing adjacent the periphery of the drive rotor, a radially extending shear liquid passageway from adjacent the dam to the liquid reservoir, the improvement comprising, the said radially extending passageway defined by a separate tube.

2. The fluid coupling of claim 1 wherein the separate tube is at least partially positioned in a groove on an interior surface of the housing adjacent the drive chamber.

3. The fluid coupling of claim 2 including a second groove on the interior surface of the drive chamber, the second groove being of the same configuration as the groove which receives the separate tube but angularly displaced from the latter by a rotation about an axis adjacent the radially innermost end of the separate tube so that its radially outermost end is adjacent the other face of the dam, whereby the separate tube may be positioned on either side of the dam for drive rotor rotation in either direction relative to the housing.

4. The fluid coupling of claim 1 wherein the radially outermost end of the separate tube is bent at a right angle to the major length of the remainder of the tube, the bent portion having a semi-cylindrical cut-out, the remainder of the bent portion having its concave side facing radially inwardly.

5. The fluid coupling of claim 4 wherein said bent portion of the separate tube axially spans at least a portion of the drive rotor.

* * * * *

UNITED STATES PATENT AND TRADEMARK OFFICE
CERTIFICATE OF CORRECTION

PATENT NO. : 4,086,990
DATED : May 2, 1978
INVENTOR(S) : HENRY JOSEPH SPENCE

It is certified that error appears in the above—identified patent and that said Letters Patent is hereby corrected as shown below:

Claim 1, column 4, line 22, after "connected", insert

-- to a prime mover, a housing relatively rotatable --.

Signed and Sealed this

Fourth Day of May 1982

[SEAL]

Attest:

GERALD J. MOSSINGHOFF

Attesting Officer   Commissioner of Patents and Trademarks